US007959396B2

(12) United States Patent
Izumi

(10) Patent No.: US 7,959,396 B2
(45) Date of Patent: Jun. 14, 2011

(54) AUTOMATED WAREHOUSE AND METHOD FOR CONTROLLING STACKER CRANE IN AUTOMATED WAREHOUSE

(75) Inventor: Takanori Izumi, Kyoto (JP)

(73) Assignee: Murata Kikai Kabushiki Kaisha, Kyoto-shi (JP)

( * ) Notice: Subject to any disclaimer, the term of this patent is extended or adjusted under 35 U.S.C. 154(b) by 399 days.

(21) Appl. No.: 11/846,637

(22) Filed: Aug. 29, 2007

(65) Prior Publication Data

US 2008/0053754 A1    Mar. 6, 2008

(30) Foreign Application Priority Data

Aug. 29, 2006    (JP) ................... 2006-231666

(51) Int. Cl.
*B65G 1/04* (2006.01)
(52) U.S. Cl. ......... 414/279; 414/807; 414/273; 700/218
(58) Field of Classification Search ............. 414/279, 414/281, 282, 807; 700/218
See application file for complete search history.

(56) References Cited

U.S. PATENT DOCUMENTS

| 3,661,280 A * | 5/1972 | Atwater ............... 414/282 |
| 3,933,257 A * | 1/1976 | Weber ................ 414/282 |
| 7,611,323 B2 * | 11/2009 | Chung ................ 414/807 |
| 2006/0078408 A1 * | 4/2006 | Chang et al. ........... 414/281 |

FOREIGN PATENT DOCUMENTS

| JP | 58-26706 A | * | 2/1983 |
| JP | 04-341404 A | | 11/1992 |
| JP | 06-024511 A | | 2/1994 |
| JP | 06-183513 A | | 7/1994 |
| JP | 06-199403 A | | 7/1994 |
| JP | 2002-293409 A | | 10/2002 |

OTHER PUBLICATIONS

Japanese Office Action dated Jul. 8, 2008, issued in corresponding Japanese Patent Application No. 2006-231666.

* cited by examiner

*Primary Examiner* — James Keenan
(74) *Attorney, Agent, or Firm* — Westerman, Hattori, Daniels & Adrian, LLP

(57) ABSTRACT

Support columns are mounted at both front and rear ends of a stacker crane 4 to form a mast having a gate shape. An elevation frame having the size which is twice as large as a front space of a rack is provided at the mast, and a base of a slide fork is moved back and forth in a travel direction relative to the elevation frame. An elevation motor for the elevation frame and front and rear travel motors are provided under the mast.

2 Claims, 5 Drawing Sheets

F I G. 1
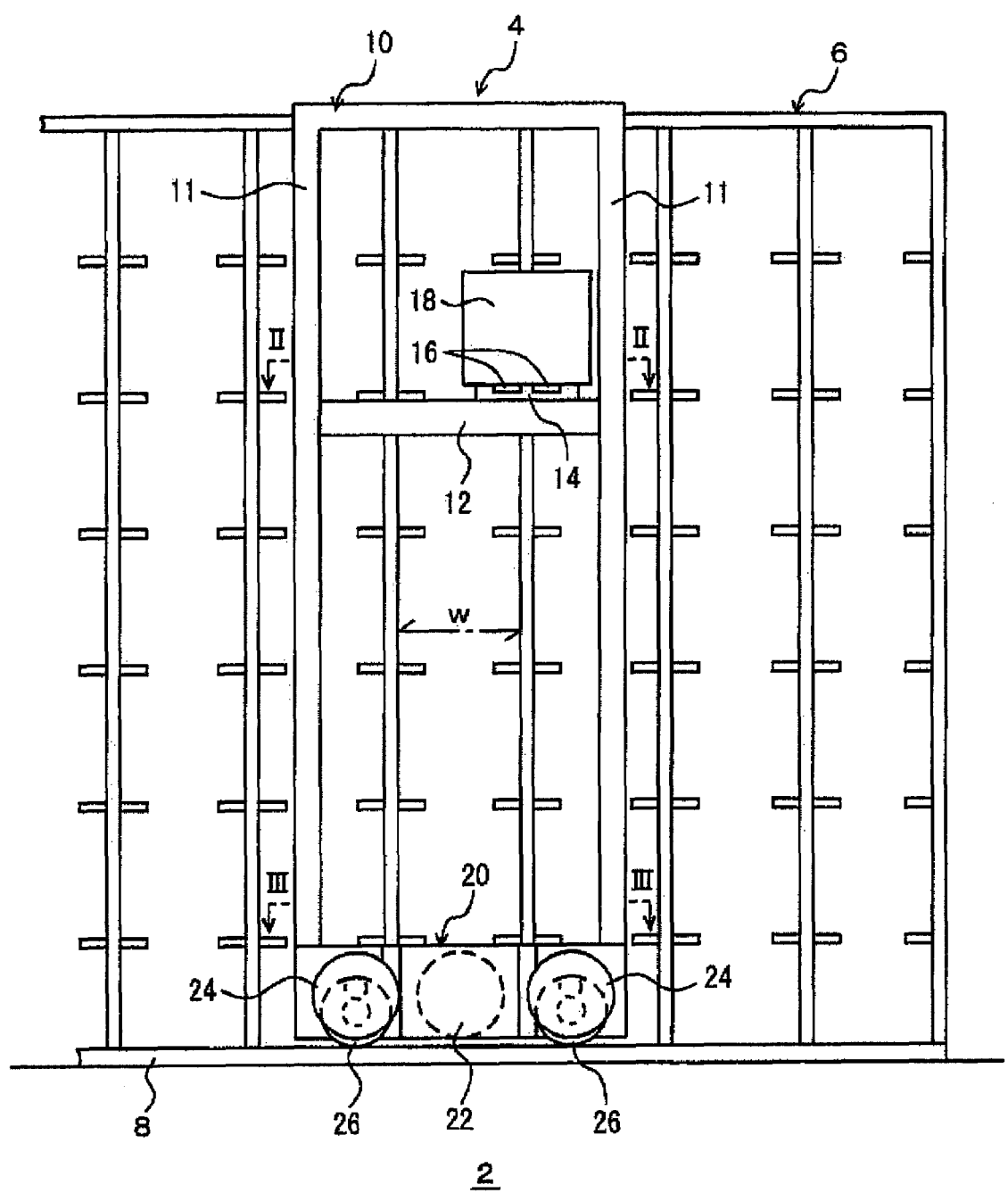

AUTOMATED WAREHOUSE AND METHOD FOR CONTROLLING STACKER CRANE IN AUTOMATED WAREHOUSE

TECHNICAL FIELD

The present invention relates to an automated warehouse having a stacker crane. In particular, the present invention relates to an automated warehouse which makes it possible to provide racks and stations along the entire length of the travel range of a stacker crane.

BACKGROUND ART

In the stacker crane, drive mechanisms such as a travel motor, an elevation motor, a drum, a control panel are provided in a space extending from a position in front of, or behind a mast of a cart, to the end of the cart. Therefore, the overall length of the stacker crane is significantly larger than the width of an elevation frame, and the travel route distance (the distance between both terminals of the travel rail) is larger than the total length of the racks. Therefore, in some spaces along the travel rail, no rack or station is provided. Under the circumstances, the desired storage efficiency in the automated warehouse cannot be achieved. In this regard, in a related conventional technique, Laid-Open Patent Application No. 6-24511 proposes a technique of providing a plurality of slide forks on an elevation frame of a stacker crane.

DISCLOSURE OF THE INVENTION

Problems to be Solved by the Invention

An object of the present invention is to improve the storage efficiency in an automated warehouse.

Another object of the present invention is to make it possible to transfer an article to the adjacent space (front space) or the like without the travel of a stacker crane.

Still another object of the present invention is to provide specific structure to achieve the foregoing objects.

Means for Solving the Problems

According to the present invention, in an automated warehouse comprising a rack and a stacker crane which travels along the rack, the stacker crane includes a mast, a travel motor and an elevation motor provided in a cart, and an elevation frame having a transfer apparatus elevated and lowered along the mast by the elevation motor.

The mast of the stacker crane includes support columns provided near both front and rear ends of the cart in a travel direction of the stacker crane to form a gate shape, and has a width which is larger than a front space of one rack. The automated warehouse further comprises:

means for moving the transfer apparatus on the elevation frame, in the travel direction of the stacker crane; and control means for controlling the means for moving, to move the transfer apparatus toward the front side of the stacker crane at the time of transferring an article at a front end in a travel route of the stacker crane, and move the transfer apparatus toward the back side of the stacker crane at the time of transferring an article at a rear end in the travel route of the stacker crane.

According to another aspect of the present invention, in a method of controlling a stacker crane in an automated warehouse, the stacker crane travels along a rack, and includes a mast, a travel motor and an elevation motor provided in a cart, and an elevation frame having a transfer apparatus elevated and lowered along the mast by the elevation motor. The method comprises the steps of:

forming a mast of the stacker crane to have a gate shape by providing support columns of the mast near both front and rear ends of the cart of the stacker crane, the mast having a width larger than a front space of one rack;

moving the transfer apparatus on the elevation frame, in the travel direction of the stacker crane; and moving the transfer apparatus toward the front side of the stacker crane at the time of transferring an article at a front end in a travel route of the stacker crane, and moving the transfer apparatus toward the back side of the stacker crane at the time of transferring an article at a rear end in the travel route of the stacker crane.

Preferably, the width between the support columns of the mast is an integer multiple of the front space of the rack.

Further, preferably, the support columns of the mast of the stacker crane are provided at both of front and rear ends of the cart, and the elevation motor and the travel motor are provided in the cart at positions between the support columns of the mast.

Advantages of the Invention

In the present invention, the mast has a gate shape, and has a width larger than the front space of one rack. Therefore, the travel motor or the elevation motor can be placed under the elevation frame, without increasing the height of the cart. Therefore, protrusion of the cart from the front side, or the back side can be eliminated, or minimized. Since the transfer means can move on the elevation frame, at the time of transferring the article at the front end of the travel route, it is possible to move the transfer apparatus toward the front side of the stacker crane, and at the time of transferring the article at the rear end of the travel route, it is possible to move the transfer apparatus toward the back side of the stacker crane. In this manner, it is possible to provide racks and stations along substantially the entire distance of the travel route of the stacker crane, and improvement in the storage efficiency in the automated warehouse is achieved. Further, since the width between the support columns of the mast is large, the stacker crane has stable structure, and the stacker crane cannot be vibrated easily. Further, by combining horizontal movement of the transfer apparatus and travel of the stacker crane, it is possible to reduce the time to arrive at the target front space.

In the case where the width between the support columns of the mast is an integral multiple of the front space of the rack, for example, if the width between the support columns of the mast is twice as large as the front space of the rack, it is possible to transfer the article between the adjacent front spaces without travel of the stacker crane, and if the width between the support columns of the mast is three times as large as the front space of the rack, it is possible to transfer the article to the front space which is away by a distance which is twice as large as the front space of the rack.

In the case where the support columns of the mast are provided at both of the front end and the rear end of the cart of the stacker crane, and the elevation motor and the travel motor are provided in the cart under the mast, in the space between the front end and the rear end of the cart, even if there is a dead space because the overall length of the stacker crane is larger than the width of the mast, it is possible to minimize the dead space.

BRIEF DESCRIPTION OF THE DRAWINGS

FIG. 1 is a side view showing an automated warehouse according to an embodiment.

DESCRIPTION OF THE NUMERALS

Figure 2:
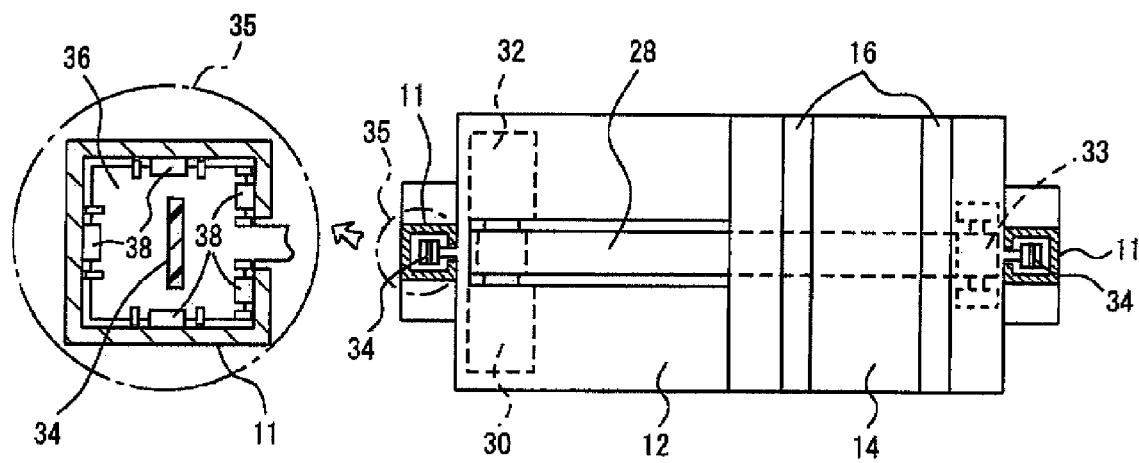
FIG. 2 is a horizontal cross sectional view taken along a line II-II in FIG. 1.

2: automated warehouse
4: stacker crane
6; rack
8: travel rail
10: mast
11: support column
12: elevation frame
14: base
16: slide fork
18: article
20: cart
22: elevation motor
24: travel motor
26: drive wheel
28: timing belt
30: motor
32: decelerator
33: pulley
34: timing belt
36: extension
38: roller
40, 44: pulley
41, 42: decelerator
50: controller
52, 53: station
w: width of front space

EMBODIMENTS

FIG. 1 to 6 show an embodiment and a modified embodiment. In the drawings, a reference numeral 2 denotes an automated warehouse, a reference numeral 4 denotes a stacker crane, a reference numeral 6 denotes a rack, and a reference numeral 8 denotes a travel rail. For example, a pair of racks 6 are provided on the left and right sides of the travel rail 8. In the embodiment, only the rack on one side is shown. Part of the front space of the rack 6 is used as a station for storage and retrieval of articles. For example, the storage and retrieval station is provided by moving the left or right end of the rack 6 to the central side beyond the left or right end of the travel rail 8. As shown in, e.g., FIG. 1, the left and right ends of the rack 6 and the left and right ends of the travel rail 8 are provided at the same positions. In the case where the storage and retrieval station is provided outside the rack 6 in the travel direction, the end of the area for transferring articles in the storage and retrieval station substantially matches the end of the travel rail 8.

Structure of the stacker crane 4 will be described. A reference numeral 10 denotes a mast having a gate shape. A pair of support columns 11 are provided on the front side and on the back side in the travel direction of the stacker crane 4. Alternatively, four support columns including two support columns on the front side and two support columns on the back side may be provided, or three support columns including two support columns on one of the front side and the back side, and one support column on the other of the front side and the back side may be provided. The elevation frame 12 is elevated, and lowered along the mast 10. The width of the elevation frame 12 along the travel direction of the stacker crane 4 is twice as large as the front space of the rack 6. In FIG. 1, the width of the front space is denoted by "W". The width of the elevation frame 12 is not limited to the size which is twice as large as the front space of the rack 6. Preferably, the width of the elevation frame 12 is an integer multiple (2 or more) of the front space of the rack 6. A base 14 moves forward or backward in the travel direction of the elevation frame 12, and transfer means such as a slide fork 16, a SCARA arm, or a conveyor is mounted on the base 14. A reference numeral 18 denotes an article on the slide fork 16. For example, the article 18 is a semiconductor cassette, or a cassette for use of reticles for exposure of semiconductors or liquid crystals.

A reference numeral 20 denotes a cart of the stacker crane 4. The width of the cart 20, between the front side and the back side in the travel direction is equal to the width of the mast 10. The support columns 11 of the mast 10 are provided on both front and rear ends of the cart 20. A reference numeral 22 denotes an elevation motor for elevating and lowering the elevation frame. A reference numeral 24 denotes a travel motor for driving drive wheels 26 for travel of the stacker crane 4. The elevation motor 22 and the travel motor 24 are provided in the cart 20, and the elevation motor 22 and the travel motors 24 do not protrude forward, or protrude backward from the area under the mast 10. In the embodiment, the total number of the drive wheels 26 is two, including one front wheel and one rear wheel, and a pair of the travel motors 24 are provided on the front side and on the back side. Alternatively, in the case where the total number of the drive wheels is four, including front and rear, and left and right wheels, for example, in total, four travel motors 24 may be provided on the front and back sides, and on the left and right sides. In the embodiment, one elevation motor 22 is provided at the center of the cart 20. Alternatively, a plurality of the elevation motors 22 may be provided.

As shown in FIG. 2, a timing belt 28 is provided in the elevation frame 12, and the timing belt 28 is driven by a motor 30, a decelerator 32, and a pulley 33 to move the base 14 of the slide fork 16 between the front support column 11 and the rear support column 11. Means for moving the base 14 is not limited to the timing belt 28, and can be chosen arbitrarily. For example, chains or ball screws may be used. A suspension member such as a timing belt 34 may be placed in the support column 11, and the suspension member is fixed to a protrusion 36 protruding from the elevation frame 12. For example, a plurality of rollers 38 are provided for guiding the protrusion 36 along the inner surface of the support column 11.

Figure 3:
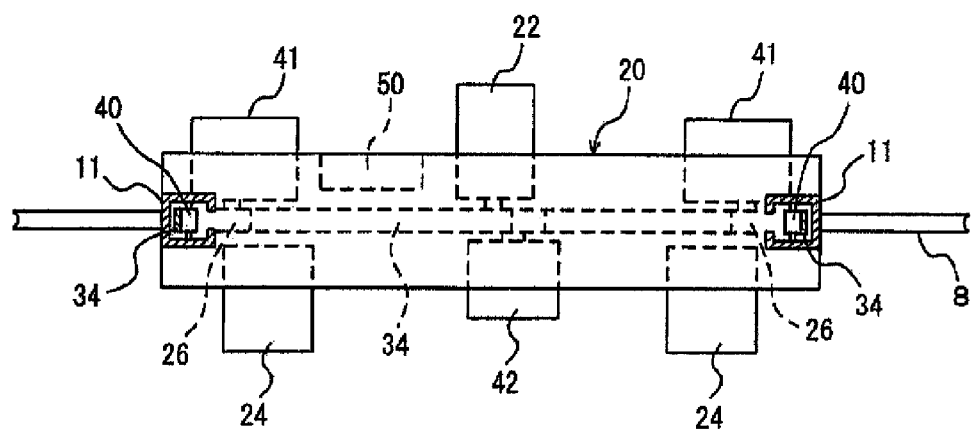
FIG. 3 is a horizontal cross sectional view taken along a line III-III in FIG. 1.

FIG. 3 shows positions of the elevation motor 22, the travel motors 24, or the like in the cart 20. For example, the timing belt 34 is guided into the cart 20 through a pulley 40, and driven by a decelerator 42 connected to the elevation motor 22. Further, the output of the travel motor 24 is decelerated by a decelerator 41, and transmitted to the drive wheels 26. The method of decelerating the motors 22, 24 can be chosen arbitrarily. As can be seen from FIG. 3, the front side and the back side of the cart 20 are symmetrical with each other. The range where the motors 22, 24 protrude from the cart 20 in a direction perpendicular to the travel rail 3 is limited to an area under the elevation frame 12 in a plan view, A reference numeral 50 denotes a control unit for controlling the motors 22, 24, and the motor 30, and controlling travel of the stacker crane 4, elevation of the elevation frame, and movement of the base 14.

Figure 4:
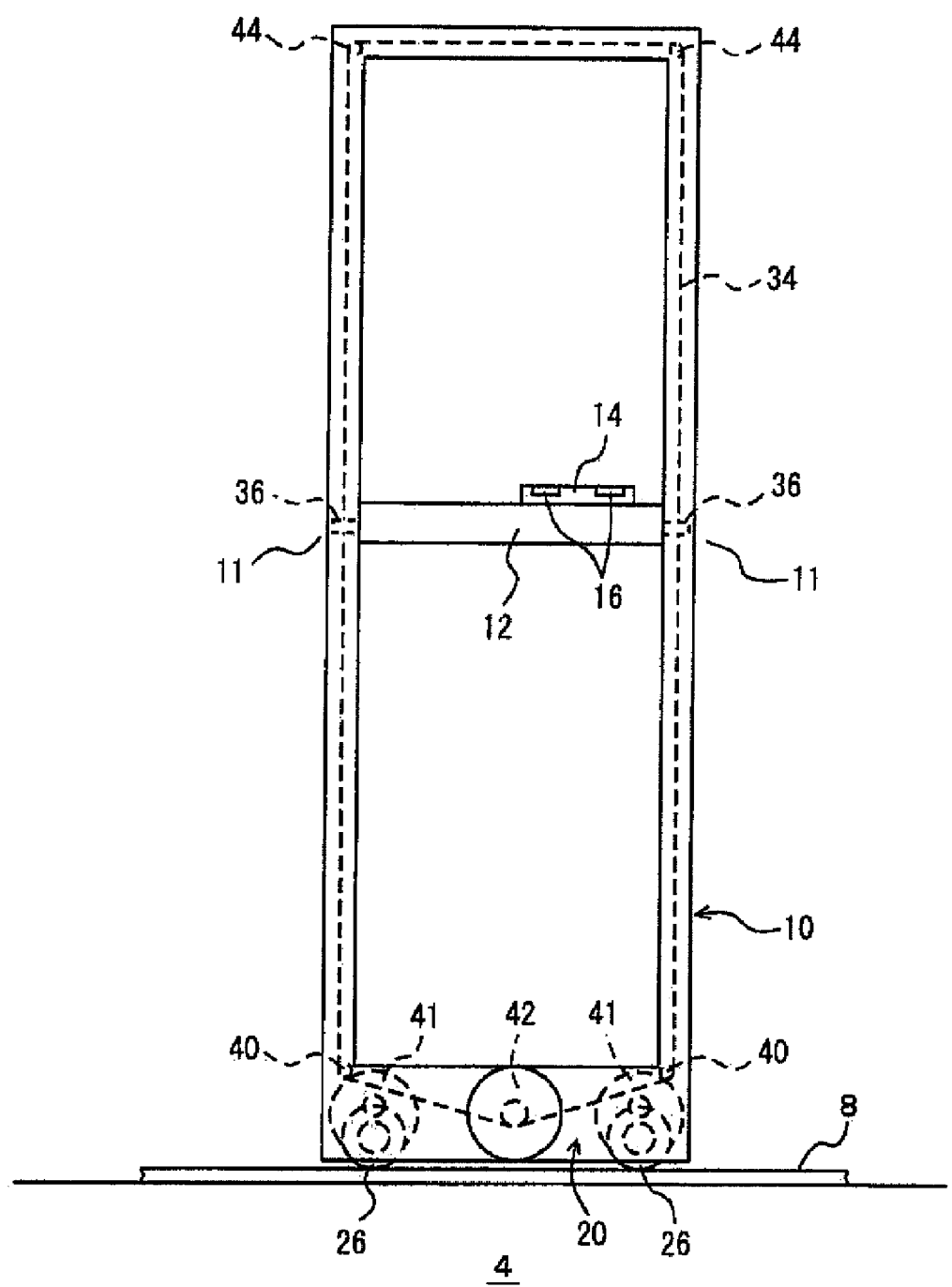
FIG. 4 is a view showing positions of a travel system and elevation system in a stacker crane used in the embodiment.

FIG. 4 shows a position of the timing belt 34. The timing belt 34 is provided to extend around inside the gate shape mast 10 and the cart 20. The timing belt 34 is guided by the pulleys 40, 44, or the like, and driven by the decelerator 42 or the like. Instead of the timing belt 34, a wire, a steel belt, or a rope may be used.

Figure 5:
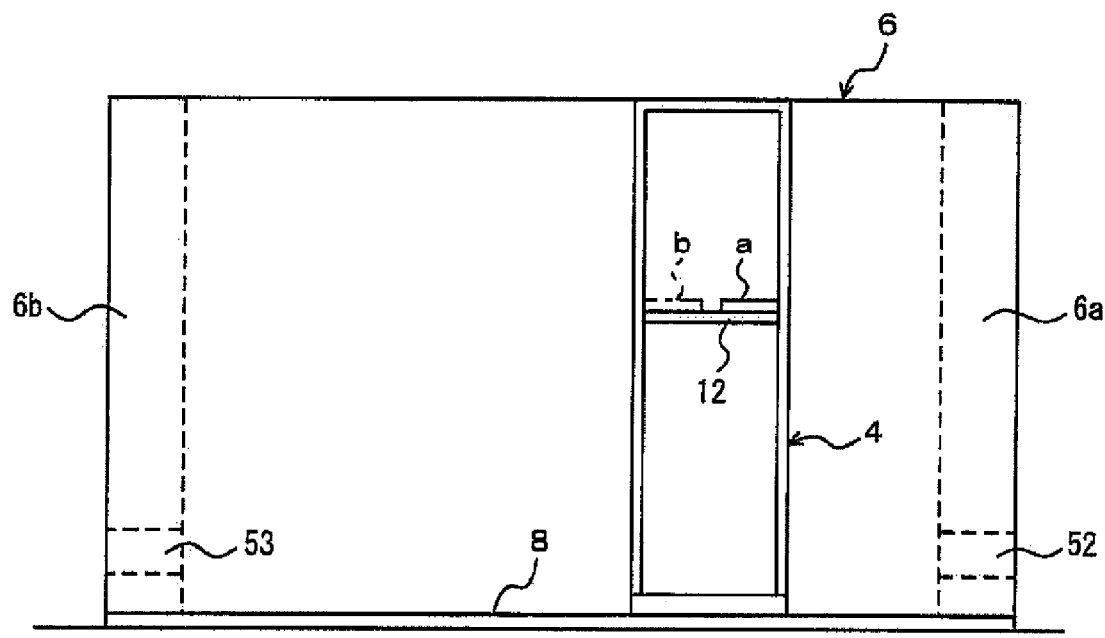
FIG. 5 is a view showing a range in a rack accessed by the stacker crane used in the embodiment.

Operation of the stacker crane 4 is shown in FIG. 5. In the case of moving an article to, or from a row 6a at an end of the rack 6, the base 14 is moved to a position denoted by "a". In the case of moving an article to, or from a row 6b at the other end of the rack 6, the base 14 is moved to a position of a chain line denoted by "b" in FIG. 5. In any of the positions other than the above, the base 14 may be moved to the position "a" or the position "b", as long as the position of the base 14 is determined to minimize the travel distance. Reference numerals 52, 53 denote stations. In the case of transfer to, or from the station 52, the base 14 is moved to the position "a", and in the case of transfer to, or from the station 53, the base 14 is moved to the position "b".

Figure 6:
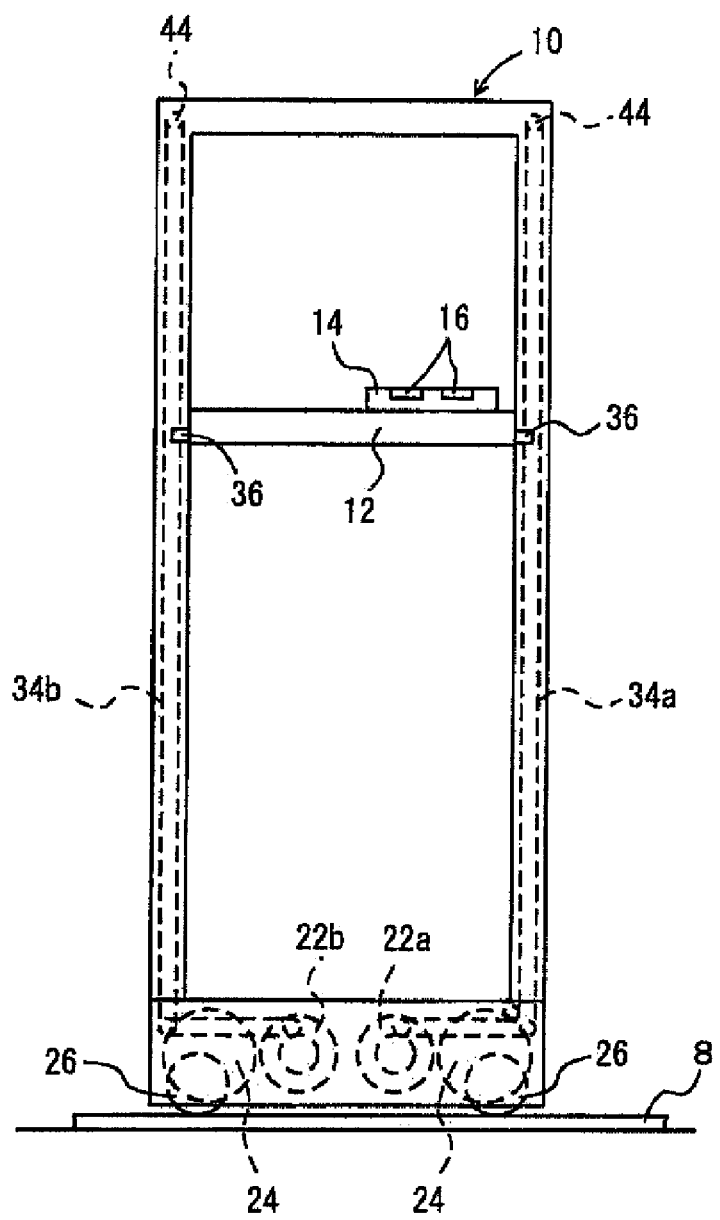
FIG. 6 is a view showing positions of a travel system and an elevation system in a stacker crane used in a modified embodiment.

FIG. 6 is a view showing a stacker crane according to a modified embodiment. Unless specifically noted, the features of the stacker crane are the same as those shown in FIGS. 1 to 5. The timing belt 34 is divided into one timing belt 34a and the other timing belt 34b, and a pair of elevation motors 22a, 22b are used for driving the timing belt 34a using the elevation motor 22a, and driving the timing belt 34b using the elevation motor 22b.

Advantages of the embodiments will be described below.
(1) Since the cart 20 does not protrude forward, or backward from the support columns 11, it is possible to provide the rack 6 or the stations 52, 53 over the entire range along the travel route of the stacker crane 4. Accordingly, it is possible to increase the storage efficiency per area of providing the rack 6 or the stations 52, 53 in the automated warehouse. In particular, the advantage is large in a clean room or the like where the cost in terms of floor area is large.
(2) Since the width of the mast 10 is large, the stacker crane has stable structure. Further, since the travel motors and elevation motors can be provided symmetrically on the front side and the back side, along the travel direction the force applied to the cart is symmetrical on the front side and the back side. In the structure, the stacker crane 4 is not shaken significantly, and the control can be implemented easily.
(3) The article can be transferred between the adjacent front spaces of the left and right racks 5, without travel of the stacker crane 4. In the case where the stacker crane 4 travels, and the base 14 moves at the same time, the travel distance can be reduced by the distance corresponding to the size of the front space. Thus, it is possible to shorten the cycle time of the stacker crane 4.
(4) Since the travel motors and the elevation motors are provided in the cart 20 having the width which is twice as large as the front space of the rack 6, it is not necessary to increase the height of the cart 20. Thus, the dead space of the rack in the height direction is minimized.

The invention claimed is:
1. An automated warehouse comprising:
   a rack;
   a stacker crane that travels along the rack to transfer an article, the stacker crane including a mast, a travel motor and an elevation motor provided in a cart, an elevation frame that is elevated and lowered along the mast by the elevation motor, and a transfer apparatus provided on the elevation frame;
   means for moving the transfer apparatus relative to the elevation frame, in a travel direction of the stacker crane; and
   control means for controlling the means for moving and for controlling the travel motor, to move the transfer apparatus toward a front side of the stacker crane at a time of controlling the travel motor to move the stacker crane along the rack in a horizontal direction to transfer an article to a front end of a travel route of the stacker crane, and for controlling the means for moving to move the transfer apparatus toward a back side of the stacker crane at a time of controlling the travel motor to move the stacker crane along the rack in a horizontal direction to transfer an article to a rear end of the travel route of the stacker crane,
   wherein the mast of the stacker crane has a gate shape and includes support columns provided at both front and rear ends of the cart in the travel direction of the stacker crane, the mast having a width larger than a front space of one rack, and
   wherein the elevation motor and the travel motor are provided in the cart at positions between the support columns of the mast such that the elevation motor and the travel motor do not extend outside an area defined between the support columns of the mast, and respective output axes of the elevation motor and the travel motor are positioned horizontally and in parallel to each other.

2. A method of controlling a stacker crane in an automated warehouse, the stacker crane traveling along a rack, and including a mast, a travel motor and an elevation motor provided in a cart, and an elevation frame having a transfer apparatus elevated and lowered along the mast by the elevation motor, the method comprising the steps of:
   forming a mast of the stacker crane to have a gate shape by providing support columns of the mast near both front and rear ends of the cart of the stacker crane, the mast having a width larger than a front space of one rack;
   providing the elevation motor and the travel motor in the cart at positions between the support columns of the mast such that the elevation motor and the travel motor do not extend outside an area defined between the support columns of the mast, and positioning respective output axes of the elevation motor and the travel motor horizontally and in parallel to each other;
   moving the transfer apparatus relative to the elevation frame, in a travel direction of the stacker crane; and
   moving the transfer apparatus toward a front side of the stacker crane at the time of moving the stacker crane along the rack in a horizontal direction to transfer an article to a front end in a travel route of the stacker crane, and moving the transfer apparatus toward a back side of the stacker crane at the time of moving the stacker crane along the rack in a horizontal direction to transfer an article to a rear end in the travel route of the stacker crane.

* * * * *